(12) United States Patent
Tsai et al.

(10) Patent No.: US 10,498,281 B2
(45) Date of Patent: Dec. 3, 2019

(54) MOTOR CONTROL SYSTEM

(71) Applicant: ANPEC ELECTRONICS CORPORATION, Hsinchu (TW)

(72) Inventors: Ming-Jung Tsai, Changhua County (TW); Li-Wei Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/847,814

(22) Filed: Dec. 19, 2017

(65) Prior Publication Data

US 2019/0068104 A1 Feb. 28, 2019

(30) Foreign Application Priority Data

Aug. 28, 2017 (TW) .............................. 106129156 A

(51) Int. Cl.
| H02P 6/15 | (2016.01) |
| H02P 8/22 | (2006.01) |
| H02P 6/16 | (2016.01) |
| H02P 27/06 | (2006.01) |

(52) U.S. Cl.
CPC ................... H02P 27/06 (2013.01)

(58) Field of Classification Search
USPC ...... 318/504, 252, 572, 602, 400.17, 400.26
See application file for complete search history.

(56) References Cited

U.S. PATENT DOCUMENTS

| 5,986,493 A * | 11/1999 | Li | ....................... H03K 17/0822 |
| | | | 327/312 |
| 6,121,736 A * | 9/2000 | Narazaki | ................. H02P 6/182 |
| | | | 318/400.02 |
| 2008/0169780 A1* | 7/2008 | Pirozzi | .............. H02M 7/53873 |
| | | | 318/599 |
| 2011/0090775 A1* | 4/2011 | Miyagoe | .............. G11B 5/5582 |
| | | | 369/47.38 |

FOREIGN PATENT DOCUMENTS

| JP | 2011193612 A | 9/2011 |
| JP | 2017046427 A | 3/2017 |
| TW | 201218614 A | 5/2012 |
| TW | 201722060 A | 6/2017 |

* cited by examiner

*Primary Examiner* — Bickey Dhakal
*Assistant Examiner* — Charles S Laughlin
(74) *Attorney, Agent, or Firm* — Li & Cai Intellectual Property (USA) Office

(57) ABSTRACT

A motor control system includes a motor, a driving module and a control module. A first coil is electrically connected to a first node where a first control signal is provided, a second coil is electrically connected to a second node where a second control signal is provided, and a third coil is electrically connected to a third node where a third control signal is provided. An constant value of the first control signal is not zero, and a lower signal voltage limit of the first control signal is larger than or equal to zero.

7 Claims, 5 Drawing Sheets

MOTOR CONTROL SYSTEM

BACKGROUND OF THE INVENTION

1. Field of the Invention

The present disclosure relates to a motor control system; in particular, to a motor control system that has less distortion of the control wave.

2. Description of Related Art

Generally, the control signal of a motor control system is controlled by a six step square wave or a sine wave. No matter the control signal of a motor control system is controlled by a six step square wave or a sine wave, in a complementary switch control circuit, the upper-side switch and the lower-side switch cannot be simultaneously turned on. Thus, there is always the "dead time". Often, the subtraction operation between two control signals is needed to generate another control signal. However, there is a phase difference between the two control signals, so one of the control signals does not have waveform distortion caused by the dead time but the other does. As a result, the signal generated by subtraction operation between the two control signals still has a distortion caused by the dead time.

Accordingly, a motor control system that has less distortion of the control wave may be required.

SUMMARY OF THE INVENTION

The present disclosure provides a motor control system includes a motor, a driving module and a control module. The motor includes a first coil, a second coil and a third coil. The driving module includes a first switch, a second switch, s third switch, a fourth switch, a fifth switch and a sixth switch. The first switch has a first end, a second end and a third end. The second switch has a first end, a second end and a third end. The first end of the first switch is coupled to a DC voltage, the third end of the first switch is electrically connected to the first end of the second switch and one end of the first coil, and the third end of the second switch is grounded. The third switch has a first end, a second end and a third end. The fourth switch has a first end, a second end and a third end. The first end of the third switch is coupled to the DC voltage, the third end of the third switch is electrically connected to the first end of the fourth switch and one end of the second coil, and the third end of the fourth switch is grounded. The fifth switch has a first end, a second end and a third end. The sixth switch has a first end, a second end and a third end. The first end of the fifth switch is coupled to the DC voltage, the third end of the fifth switch is electrically connected to the first end of the sixth switch and one end of the third coil, and the third end of the sixth switch is grounded. The other end of the first coil is electrically connected to the other end of the second coil and the other end of the third coil. The control module provides a first signal, a second signal, a third signal, a fourth signal, a fifth signal and a sixth signal respectively to the second ends of the first switch, the second switch, the third switch, the fourth switch, the fifth switch and the sixth switch to turn on or off the first switch, the second switch, the third switch, the fourth switch, the fifth switch and the sixth switch. The control module provides a first control signal at a first node between the third end of the first switch and the first end of the second switch, provides a second control signal at a second node between the third end of the third switch and the first end of the fourth switch, and provides a third control signal at a third node between the third end of the fifth switch and the first end of the sixth switch. The first node is electrically connected to the one end of the first coil, the second node is electrically connected to the one end of the second coil, and the third node is electrically connected to the one end of the third coil. A constant value of the first control signal is unequal to zero, and a lower signal voltage limit of the first control signal is larger than or equal to zero.

In one embodiment of the motor control system provided by the present disclosure, the first control signal includes a first segment, a second segment and a third segment. The first segment, the second segment and the third segment are adjacent to each other. The waveform of a first signal within the first segment is mirror-symmetrical to the waveform of a second signal within the second segment, and the waveform of a third signal within the third segment keeps a constant value.

In one embodiment of the motor control system provided by the present disclosure, the constant value of the first control signal is between an triangle high level limit and a triangle low level limit. In addition, a constant value of the second control signal is between the triangle high level limit and the triangle low level limit, and a constant value of the third control signal is between the triangle high level limit and the triangle low level limit.

In one embodiment of the motor control system provided by the present disclosure, the first control signal has an upper signal voltage limit. The upper signal voltage limit of the first control signal is smaller than or equal to the triangle high level limit. Also, the upper signal voltage limit of the first control signal is larger than or equal to the constant value of the first control signal.

In one embodiment of the motor control system provided by the present disclosure, the lower signal voltage limit of the first control signal is larger than or equal to the triangle low level limit. Also, the lower signal voltage limit of the first control signal is smaller than or equal to the constant value of the first control signal.

In one embodiment of the motor control system provided by the present disclosure, the control module generates a PWM signal according to a triangle wave and a control signal. Also, the control module provides the first signal, the second signal, the third signal, the fourth signal, the fifth signal and the sixth signal respectively to the second ends of first switch, the second switch, the third switch, the fourth switch, the fifth switch and the sixth switch according to the PWM signal.

In one embodiment of the motor control system provided by the present disclosure, the triangle wave has a constant frequency and the triangle wave is between a triangle high level limit and a triangle low level limit.

In one embodiment of the motor control system provided by the present disclosure, the control signal includes a first segment, a second segment and a third segment. The first segment, the second segment and the third segment are adjacent to each other. The waveform of a first signal within the first segment is mirror-symmetrical to the waveform of a second signal within the second segment, and the waveform of a third signal within the third segment keeps a constant value.

In one embodiment of the motor control system provided by the present disclosure, the first coil, the second coil and the third coil form a Y-shaped configuration.

To sum up, in the motor control system provided by the present disclosure, the waveform of the control signals provided to two ends of each coil is adjusted by setting the constant value of the control signal to be unequal to zero and then repeating the waveform. In this manner, a waveform distortion due to the dead time occurs to the control signals provided to two ends of each coil. By doing the subtraction operation between the control signals provided to two ends of a coil, an optimized voltage wave or an optimized current wave is generated.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

It will be understood that, although the terms first, second, third, and the like, may be used herein to describe various elements, these elements should not be limited by these terms. These terms are only to distinguish one element from another element, and the first element discussed below could be termed a second element without departing from the teachings of the instant disclosure. As used herein, the term "and/or" includes any and all combinations of one or more of the associated listed items.

There are several embodiments described as follows for illustrating but not for restricting the motor control system provided by the present disclosure.

[One Embodiment of the Motor Control System]

Figure 1:
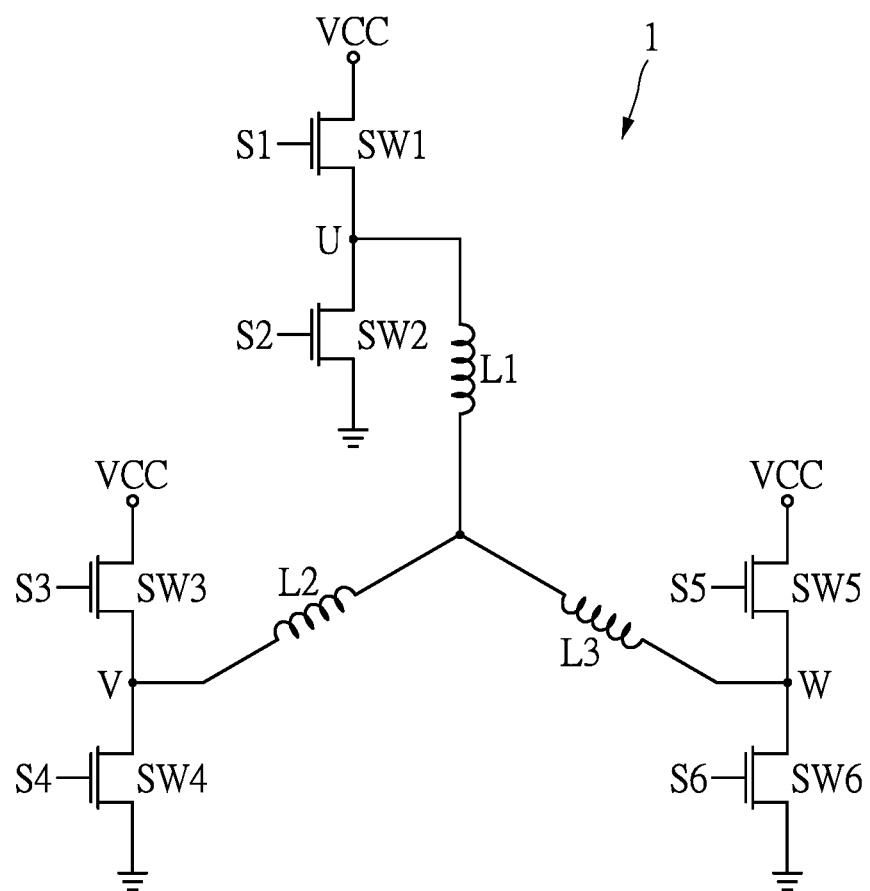
FIG. 1 shows a schematic diagram of a motor control system according to one embodiment of the present disclosure.

Referring to FIG. 1, a schematic diagram of a motor control system according to one embodiment of the present disclosure is shown.

In this embodiment, the motor control system 1 includes a motor (not shown), a driving module (not shown) and a control module (not shown).

The motor includes a first coil L1, a second coil L2 and a second coil L3. The motor is a three-phase motor. The driving module includes a first switch SW1, a second switch SW2, a third switch SW3, a fourth switch SW4, a fifth switch SW5 and a sixth switch SW6. The first end of the first switch SW1 is coupled to a DC voltage VCC. The third end of the first switch SW1 is electrically connected to the first end of the second switch SW2. The third end of the second switch SW2 is grounded. The first end of the third switch SW3 is coupled to the DC voltage VCC. The third end of the third switch SW3 is electrically connected to the first end of the fourth switch SW4. The third end of the fourth switch SW4 is grounded. The first end of the fifth switch SW5 is coupled to the DC voltage VCC. The third end of the fifth switch SW5 is electrically connected to the first end of the sixth switch SW6. The third end of the sixth switch SW6 is grounded. The control module provides a first signal S1, a second signal S2, a third signal S3, a fourth signal S4, a fifth signal S5 and a sixth signal S6 respectively to the second ends of the first switch SW1, the second switch SW2, the third switch SW3, the fourth switch SW4, the fifth switch SW5 and the sixth switch SW6. It should be noted that, the DC voltage VCC can be freely adjusted depending on needs.

The first switch SW1, the second switch SW2, the third switch SW3, the fourth switch SW4, the fifth switch SW5 and the sixth switch SW6 can be, for example, MOSFETs (Metal-Oxide-Semiconductor Field-Effect Transistor; MOSFET) or IGBTs (Insulated Gate Bipolar Transistor; IGBT).

One end of the first coil L1 is electrically connected to the first node U, which is a node between the third end of the first switch SW1 and the first end of the second switch SW2. One end of the second coil L2 is electrically connected to the second node V, which is a node between the third end of the third switch SW3 and the first end of the fourth switch SW4. One end of the third coil L3 is electrically connected to the third node W, which is a node between the third end of the fifth switch SW5 and the first end of the sixth switch SW6. In addition, the other end of the first coil L1 is electrically connected to the other end of the second coil L2 and the other end of the third coil L3. Thus, the first coil L1, the second coil L2 and the third coil L3 form a Y-shaped configuration.

Figure 2:
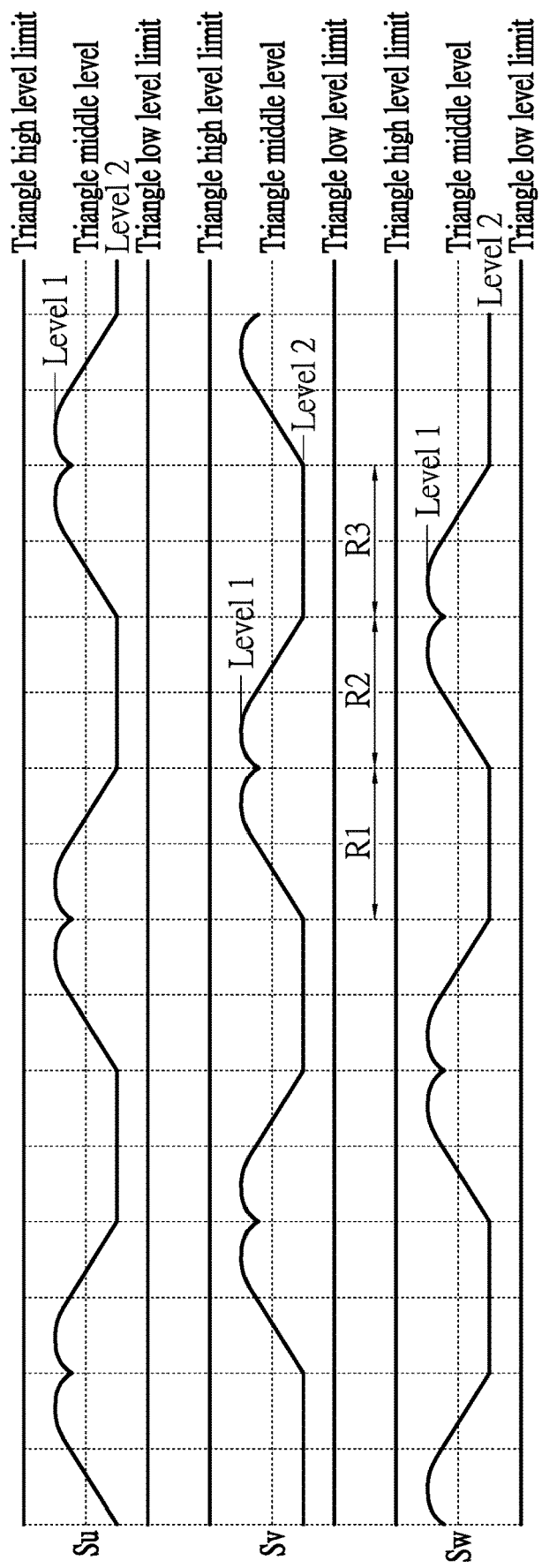
FIG. 2 shows a schematic diagram of control signals generated by a motor control system according to one embodiment of the present disclosure.

Referring to FIG. 2, a schematic diagram of control signals generated by a motor control system is shown. The motor control system 1 provides a first control signal Su, a second control signal Sv and a third control signal Sw respectively to the first node U, the second node V and the third node W. In this manner, the current of the motor has a more symmetrical waveform.

The first control signal Su, the second control signal Sv and the third control signal Sw have the same waveform. In addition, the first control signal Su, the second control signal Sv and the third control signal Sw have a 120° phase difference between each other. In other words, the second control signal Sv is $2\pi/3$ behind the first control signal Su, and the third control signal Sw is $2\pi/3$ behind the second control signal Sv. The first control signal Su, the second control signal Sv and the third control signal Sw represent respectively the waveforms of the voltage at the first node U, the second node V and the third node W. A wave having a sin-wave-like waveform can be generated by doing a subtraction operation between the first control signal Su and the second control signal Sv, and the waveform of this wave shows a phase voltage from the first node U to the second node V. Also, the waveform of the current flowing through the first coil L1 and the second coil L2 is similar to the waveform of this wave.

For ease of illustration, the following description is regarding to the second control signal Sv; however, the first control signal Su and the third control signal Sw have similar features.

The second control signal Sv includes three segments, which are the first segment R1, the second segment R2 and the third segment R3. The waveform of the signal within the first segment R1 is mirror-symmetrical to the waveform of the signal within the second segment R2. The waveform of the signal within the third segment R3 keeps a constant value, and in other words, the signal within the third segment R3 has a constant value. In addition, the second control signal Sv has a triangle middle level. The triangle middle level is not zero but between an triangle high level limit and a triangle low level limit. It should be noted that, the triangle high level limit is set according to the driving ability of the control module, and the triangle low level limit is zero. The first segment R1, the second segment R2 and the third segment R3 are adjacent to each other. Also, the first segment R1, the second segment R2 and the third segment R3 form the wave within one period of the second control signal Sv. The time periods of the first segment R1, the second segment R2 and the third segment R3 are the same, and in other words, the phases of the first segment R1, the second segment R2 and the third segment R3 are all $2\pi/3$.

The triangle middle level of the second control signal Sv is half of the triangle high level limit, which is at the middle between the triangle high level limit and the triangle low level limit. Thus, the waveform of the second control signal Sv extends from the triangle middle level or extends back from the triangle middle level. In other embodiments, the triangle middle level of the second control signal Sv is a quarter of the triangle high level limit or three quarters of the triangle high level limit. According to the difference between the triangle high level limit and the triangle low level limit, the waveform of the second control signal Sv of which the duty cycle is 0%~100% can be determined. For example, when the duty cycle of the second control signal Sv is 0%, the waveform of the second control signal Sv keeps a constant value, but when the duty cycle of the second control signal Sv is 50%, the difference between the upper signal voltage limit (in FIG. 2, labeled as Level 1) of the second control signal Sv and the lower signal voltage limit (in FIG. 2, labeled as Level 2) of the second control signal Sv is half of the triangle high level limit. When the duty cycle of the second control signal Sv is 100%, the upper signal voltage limit (in FIG. 2, labeled as Level 1) of the second control signal Sv is equal to the triangle high level limit, and the lower signal voltage limit (in FIG. 2, labeled as Level 2) of the second control signal Sv is equal to the triangle low level limit, which is zero.

In this embodiment, the triangle middle level of the first control signal Su, the triangle middle level of the second control signal Sv, and the triangle middle level of the third control signal Sw are not zero, and are all between the triangle high level limit and the triangle low level limit. The triangle low level limit is zero, so a waveform distortion due to the dead time occurs to all of the first control signal Su, the second control signal Sv and the third control signal Sw. However, the waveform distortion due to the dead time can be canceled by doing the subtraction operation between two control signals. As a result, the waveform of the phase voltage or the waveform of the coil current will not be affected by the waveform distortion.

Figure 3:
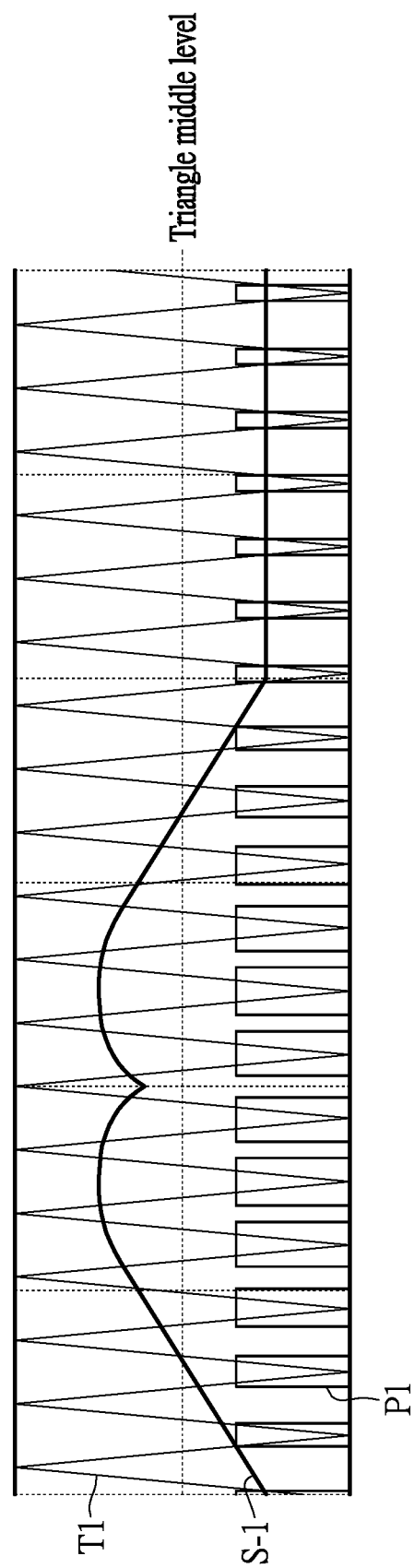
FIG. 3 shows a schematic diagram of the control signal and the triangle wave used in a motor control system according to one embodiment of the present disclosure.

Referring to FIG. 3, a schematic diagram of the control signal and the triangle wave using in a motor control system according to one embodiment of the present disclosure is shown.

To provide the first control signal Su, the second control signal Sv and the third control signal Sw respectively to the first node U, the second node V and the third node X, the control module generates a PWM signal P1 according to a triangle wave T1 and a control signal S-1.

The triangle wave T1 has a constant frequency, and the amplitude and the frequency of the control signal S-1 can be adjusted according to needs. In addition, like the first control signal Su, the second control signal Sv and the third control signal Sw, the control signal S-1 is also a control signal having M-shaped waveform. The control module generates the control signal S-1 by using, for example, a digital wave generator.

The PWM signal P1 is generated according to the cross points of the triangle wave T1 and the control signal S-1. The amplitude and the frequency of the control signal S-1 can be adjusted according to needs, and thus different PWM signals P1 are generated based on various control signals S-1.

The PWM signal P1 is generated by the control module. Specifically, the control module generates different PWM signals P1 according to a triangle wave T1 and various control signals S-1 having different phases. Then, the control module provides a first signal S1, a second signal S2, a third signal S3, a fourth signal S4, a fifth signal S5 and a sixth signal S6 according to different PWM signals P1.

Figure 4:
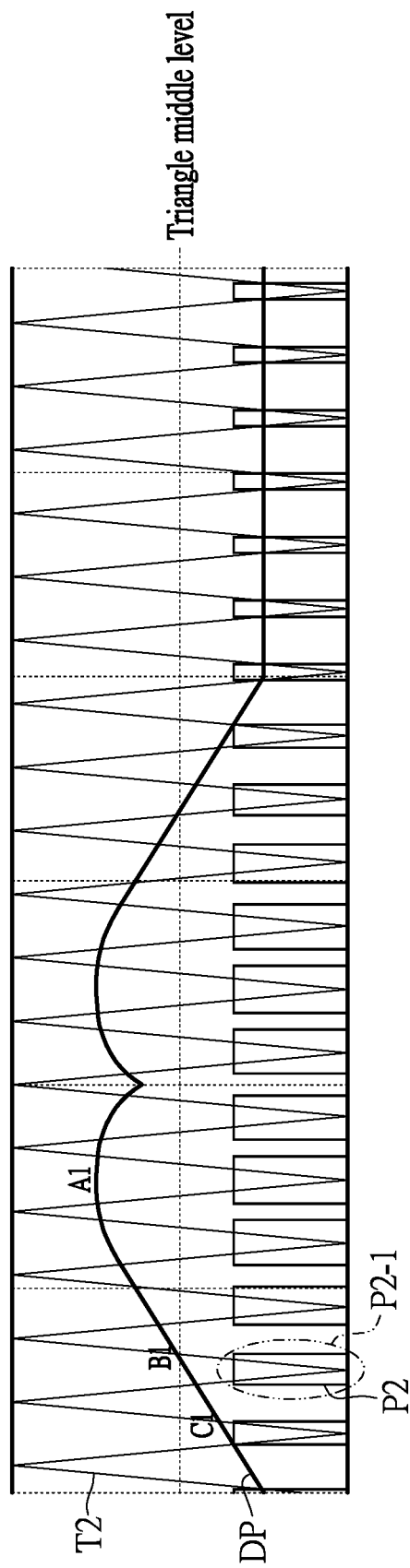
FIG. 4 shows a schematic diagram of the control signal and the triangle wave used in a motor control system according to another embodiment of the present disclosure.

Referring to FIG. 4, a schematic diagram of the control signal and the triangle wave using in a motor control system according to another embodiment of the present disclosure is shown. The control signal DP shown in FIG. 4 can be generated by turning on and off the first switch SW1, the second switch SW2, the third switch SW3, the fourth SW4, the fifth switch SW5 and the sixth switch SW6. For example, the control signal DP is generated by 8-bits digital driving. In FIG. 4, the point A in the waveform of the control signal DP has a digital value that is about "192", the point B1 in the waveform of the control signal DP has a digital value that is about "128", and the point C1 in the waveform of the control signal DP has a digital value that is about "96". In addition, the triangle wave T2 is also generated by 8-bits digital driving. Thus, a required PWM signal P2 can be obtained by comparing the control signal DP and the triangle wave T2.

Figure 5A:
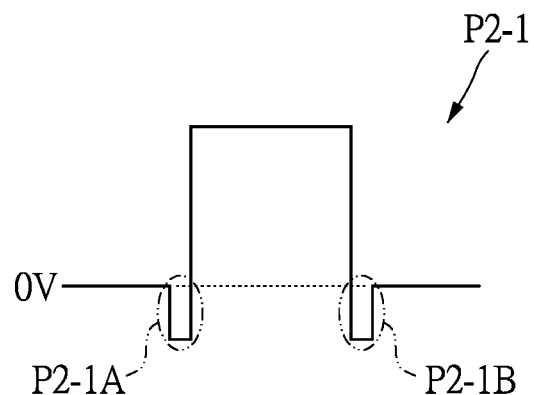
FIG. 5A shows a waveform diagram of the partial PWM signal in FIG. 4.
Figure 5B:
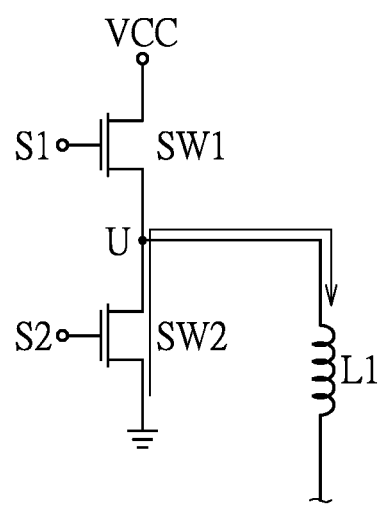
FIG. 5B shows a schematic diagram of the current corresponding to the waveform of the PWM signal in FIG. 5A.

FIG. 5A shows a waveform diagram of the PWM signal in FIG. 4, and FIG. 5B shows a schematic diagram of the current corresponding to the waveform of the PWM signal in FIG. 5B.

As shown in FIG. 5A, part of the waveform of the PWM signal P2, which is labeled as P2-1, is obtained by amplifying one square wave of the PWM signal P2 in FIG. 4. The segment P2-1A is the upper edge of the waveform P2-1, and the segment P2-1B is the lower edge of the waveform P2-1. According to the circuit operation of the circuit shown in FIG. 5B, the segment P2-1A and the segment P2-1B are waveforms shown when the first switch SW1 and the second switch SW2 are both turned off, and a current flows through the body diode of the switch SW2 and then to the first coil L1 (herein, the current direction is shown by the arrow in FIG. 5A). It should be noted that, the segment P2-1A and the segment P2-1B are defined as "dead time".

In this embodiment, switches are turned on or off according to PWM signals which are similar to the PWM signal P2. Thus, a waveform distortion occurs to the control signal DP due to the dead time. Specifically, a waveform distortion occurs to the above mentioned first control signal Su, the second control signal Sv and the third control signal Sw. In this case, the waveform distortion caused by the dead time can be canceled by a subtraction operation between any two of the first control signal Su, the second control signal Sv and the third control signal Sw. As a result, the waveform of the current flowing through the first coil L1, the second coil L2 or the third coil L3 can be improved.

To sum up, in the motor control system provided by the present disclosure, the waveform of the control signals provided to two ends of each coil is adjusted by setting the constant value of the control signal to be unequal to zero and then repeating the waveform. In this manner, a waveform distortion due to the dead time occurs to the control signals provided to two ends of each coil. By doing the subtraction operation between the control signals provided to two ends of a coil, an optimized voltage wave or an optimized current wave is generated.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A motor control system, comprising:
a motor, including a first coil, a second coil and a third coil;
a driving module, including:
a first switch, having a first end, a second end and a third end;
a second switch, having a first end, a second end and a third end, wherein the first end of the first switch is coupled to a DC voltage, the third end of the first switch is electrically connected to the first end of the second switch and one end of the first coil, and the third end of the second switch is grounded;
a third switch, having a first end, a second end and a third end;
a fourth switch, having a first end, a second end and a third end, wherein the first end of the third switch is coupled to the DC voltage, the third end of the third switch is electrically connected to the first end of the fourth switch and one end of the second coil, and the third end of the fourth switch is grounded;
a fifth switch, having a first end, a second end and a third end; and
a sixth switch, having a first end, a second end and a third end, wherein the first end of the fifth switch is coupled to the DC voltage, the third end of the fifth switch is electrically connected to the first end of the sixth switch and one end of the third coil, and the third end of the sixth switch is grounded, and wherein the other end of the first coil is electrically connected to the other end of the second coil and the other end of the third coil; and
a control module, providing a first signal, a second signal, a third signal, a fourth signal, a fifth signal and a sixth signal respectively to the second ends of the first switch, the second switch, the third switch, the fourth switch, the fifth switch and the sixth switch to turn on or off the first switch, the second switch, the third switch, the fourth switch, the fifth switch and the sixth switch, providing a first control signal at a first node between the third end of the first switch and the first end of the second switch, a second control signal at a second node between the third end of the third switch and the first end of the fourth switch, and a third control signal at a third node between the third end of the fifth switch and the first end of the sixth switch;
wherein the first node is electrically connected to the one end of the first coil, the second node is electrically connected to the one end of the second coil, and the third node is electrically connected to the one end of the third coil;
wherein each of the first control signal, the second control signal and the third control signal is generated by 8-bits digital driving and includes one or more M-shaped waveforms, a point in each of the M-shaped waveforms has a digital value that is 128;
wherein each of the M-shaped waveforms includes a first segment and a second segment, the waveform within the first segment extends from the point having the digital value of 128 respectively to an upper point and to a first lower point in the M-shaped waveform, the waveform within the second segment extends from the point having the digital value of 128 respectively to the upper point and to a second lower point in the M-shaped waveform;
wherein the control module generates PWM signals according to a triangle wave and each of the first control signal, the second control signal and the third control signal, and provides the first signal, the second signal, the third signal, the fourth signal, the fifth signal and the sixth signal according to the PWM signals.

2. The motor control system according to claim 1, wherein the first control signal further includes a third segment, the first segment, the second segment and the third segment are adjacent to each other, the waveform of the first control signal within the first segment is mirror-symmetrical to the waveform of the second control signal within the second segment, and the waveform of the third control signal within the third segment keeps a constant value.

3. The motor control system according to claim 2, wherein the first control signal has an upper signal voltage limit, the upper signal voltage limit of the first control signal is smaller than or equal to the triangle high level limit, and the upper signal voltage limit of the first control signal is larger than or equal to the digital value of 128 of the first control signal.

4. The motor control system according to claim 2, wherein the lower signal voltage limit of the first control signal is larger than or equal to the triangle low level limit, and the lower signal voltage limit of the first control signal is smaller than or equal to the digital value of 128 of the first control signal.

5. The motor control system according to claim 1, wherein the digital value of 128 of the first control signal is between a triangle high level limit and a triangle low level limit, the digital value of 128 of the second control signal is between the triangle high level limit and the triangle low level limit, and the digital value of 128 of the third control signal is between the triangle high level limit and the triangle low level limit.

6. The motor control system according to claim 1, wherein the triangle wave has a constant frequency and the triangle wave is between a triangle high level limit and a triangle low level limit.

7. The motor control system according to claim 1, wherein the first coil, the second coil and the third coil form a Y-shaped configuration.

* * * * *